(12) United States Patent
De Pinedo et al.

(10) Patent No.: US 7,637,178 B2
(45) Date of Patent: Dec. 29, 2009

(54) DEVICE FOR THE ACTUATION OF VEHICLE BRAKES

(75) Inventors: Santiago Alberto Ortiz De Pinedo, Cambrils (ES); Jaume Prat Terradas, Barcelona (ES); Enrique Perez Navarro, Barcelona (ES)

(73) Assignee: Fico Cables, S.A., Mollet Del Valles (ES)

( * ) Notice: Subject to any disclaimer, the term of this patent is extended or adjusted under 35 U.S.C. 154(b) by 924 days.

(21) Appl. No.: 10/493,073

(22) PCT Filed: Oct. 18, 2002

(86) PCT No.: PCT/EP02/11710

§ 371 (c)(1),
(2), (4) Date: Mar. 31, 2005

(87) PCT Pub. No.: WO03/035441

PCT Pub. Date: May 1, 2003

(65) Prior Publication Data

US 2005/0183908 A1   Aug. 25, 2005

(30) Foreign Application Priority Data

Oct. 18, 2001   (DE) .............................. 101 51 475

(51) Int. Cl.
*G05G 1/04* (2006.01)
*G05G 5/06* (2006.01)

(52) U.S. Cl. ...................... 74/523; 74/501.5 R; 74/535; 74/536

(58) Field of Classification Search .................... 74/512, 74/535, 560, 505, 506, 523, 501.5 R, 536; 188/2 D
See application file for complete search history.

(56) References Cited

U.S. PATENT DOCUMENTS

| 4,841,798 | A | * | 6/1989 | Porter et al. ............. 74/501.5 R |
| 5,309,786 | A | * | 5/1994 | Pare et al. ...................... 74/512 |
| 5,448,928 | A | * | 9/1995 | Harger ........................ 74/523 |
| 5,819,595 | A | | 10/1998 | Cebollero |
| 5,907,977 | A | | 6/1999 | Huebner et al. |

(Continued)

FOREIGN PATENT DOCUMENTS

DE   20020759 U1   2/2001

(Continued)

OTHER PUBLICATIONS

International Search Report for International Patent Application No. PCT/EP02/11710, dated Jan. 23, 2004, 2 pages.

*Primary Examiner*—Vinh T. Luong
(74) *Attorney, Agent, or Firm*—Marshall, Gerstein & Borun LLP

(57) ABSTRACT

A device for the actuation of vehicle brakes has a pull element which can be brought into a lockable braking position in order to pull at least a part of a vehicle brake, the pull element being capable of being tensioned by a tension element in this braking position, and which can be brought into a released position, in which the pull element is relaxed to an extent such that the at least a part of the vehicle brake is released, the device being provided with a retensioning device which, in the released position, automatically retensions the pull element.

12 Claims, 10 Drawing Sheets

U.S. PATENT DOCUMENTS

| | | | |
|---|---|---|---|
| 6,122,990 A * | 9/2000 | Bode et al. | 74/535 |
| 6,240,804 B1 | 6/2001 | Cebollero | |
| 6,363,811 B1 * | 4/2002 | Saldana | 74/512 |
| 6,382,048 B1 | 5/2002 | Youn et al. | |

FOREIGN PATENT DOCUMENTS

| | | |
|---|---|---|
| EP | 0792781 B1 | 1/2000 |
| EP | 0995652 B1 | 9/2002 |
| WO | WO 2005/120914 A2 * | 12/2005 |

* cited by examiner

DEVICE FOR THE ACTUATION OF VEHICLE BRAKES

CROSS-REFERENCE TO RELATED APPLICATION

This is the U.S. National Phase of International Application No. PCT/EP02/11710 filed 18 Oct. 2002, the entire disclosure of which is incorporated herein by references.

FIELD OF THE DISCLOSURE

The invention relates to a device for actuating vehicle brakes.

BACKGROUND OF THE DISCLOSURE

Devices of this type are known, in particular, in connection with handbrakes of motor vehicles. The motor vehicle is braked by a handbrake being pulled, wherein the lever locks in the braking position. Devices of this type are normally provided with a pull element, in particular a Bowden cable, in order to transmit the force from the handbrake to the vehicle brakes. Since the Bowden cable is subjected to constant stress, however, it stretches in the course of time. The result of this stretching is that the handbrake has to be reset after a specific period of time. It is known to carry out this tightening by means of a thread and a nut. The disadvantage of this solution, however, is that, on the one hand, resetting must take place manually and, on the other hand, the lever position is different from before the adjustment. This new lever position is often felt to be unfamiliar and therefore has an adverse effect.

To solve this problem, devices are already known in which the pull element is retensioned automatically. Automatic adjustment takes place by means of sawtooth elements which function in a similar way to a ratchet. However, not just any changes in length of the pull element can be set, since the change in length must exceed at least the tooth size predetermined in each case. If this readjustment is to be as continuous as possible, therefore, the teeth selected must be as small as possible. If the teeth become too small, there is the risk that the positive connection will be broken and the action of the handbrake lost. Another disadvantage is the unpleasant noises caused during adjustments. Finally, another disadvantage is that the teeth may have burrs which are undesirable.

SUMMARY OF THE DISCLOSURE

The object of the present invention is, therefore, to provide a device according to the precharacterizing clause of claim 1, in which the automatic resetting operation takes place as continuously as possible, without the disadvantages mentioned above.

This object is achieved by means of the subject of claim 1, whilst advantageous developments of the invention are characterized in the subclaims.

Since the tension element is provided with at least one gripping means acting non-positively on the tension element under the spring effect of a first spring element, continuous adjustment is achieved, in contrast to a positive connection by means of a tooth solution or the like, and the adjustment operation is not even noticed. That is to say, there are neither clicking noises nor any other knocking noises or vibrations.

According to claim 2, automatic tensioning is achieved in that, in the released position, the gripping means can be released from the tension element by means of a stop element arranged on the device, in such a way that the gripping means slides over the tension element. The actual retensioning function is accordingly achieved in that, in the released position, the tension element is arranged so as to be movable under the effect of a second spring element in such a way and the spring force of the second spring element is dimensioned in such a way that the tension element is automatically retensioned, whilst, in the braking position, the gripping means is connected non-positively to the tension element.

It is particularly advantageous if the tension element is arranged so as to be rotatable under the effect of the second spring element, with the result that a highly compact embodiment is achieved. So that a particularly favorable force transmission can take place between a manual actuation lever of the handbrake and the pull element which actuates the brakes, the axis of rotation of the tension element is arranged eccentrically to the center of rotation of the manual actuation lever.

A particularly cost-effective solution is obtained when the gripping means is a coil-like spring which is under a spring effect due to its own spring force.

It is particularly advantageous that the tension element has a cylindrical portion, around which the coil-like spring is arranged fixedly, and that the coil-like spring is fixedly connected at one spring end to a carrying part, whilst at its other spring end the spring forms an actuating portion which is arranged tangentially to the outer cylindrical surface and which can be actuated by the stop element in such a way that the diameter of the coil-like spring is increased to an extent such that the cylindrical portion is released from the coil-like spring, because, as a result of this, on the one hand, a solution highly convenient in terms of assembly has been afforded and, on the other hand, known parts which are relatively cost-effective are provided.

It is particularly advantageous, furthermore, that the stop element is arranged adjustably, with the result that manufacturing tolerances in the gripping means can be compensated or with the result that the device can be adjusted for the automatic resetting.

It is also advantageous that the pull element is provided with a compensating element, because different movements of a plurality of brakes can thereby be compensated.

So that the function of a handbrake in the braking position is maintained in every case and, in particular, all standard values can be fulfilled, the device has a third spring element which is arranged between a carrier part of the device and the first spring element in such a way that, in the braking position, the third spring element has a force-intensifying effect in order to increase the non-positive connection of the gripping means to the tension element, whilst, in the released position, the stop element counteracts the force effect of the third spring element, with the result that, in the released position, the gripping means continues to be capable of sliding with respect to the tension element.

A particularly favorable solution for generating the appropriate force for tightening the pull element is for the second spring element to be a helical spring in spiral form, so that the spring element is capable of being integrated particularly easily into the device.

The mounting of the device in a vehicle is made substantially easier if a mounting securing element is arranged, which can be brought into a mounting position, the mounting securing element retaining the tension element in the mounting position.

It is particularly convenient for mounting if the mounting securing element is connected captively to the device.

A particularly simple and favourable solution for making mounting simpler is obtained by the mounting securing element being designed as a resilient wire-like securing element which is fixedly connected at one end to a carrier part and at its other end has a hook-like projection which is capable of penetrating with its projection into a window-like orifice counter to its spring force, a rib of the tension element being arranged behind the orifice, and the mounting securing element being capable of being anchored to said rib.

BRIEF DESCRIPTION OF THE DRAWINGS

The invention is explained in more detail with reference to the exemplary embodiment in which further features and advantages of the invention are explained. In the drawing.

DETAILED DESCRIPTION

Figure 1:
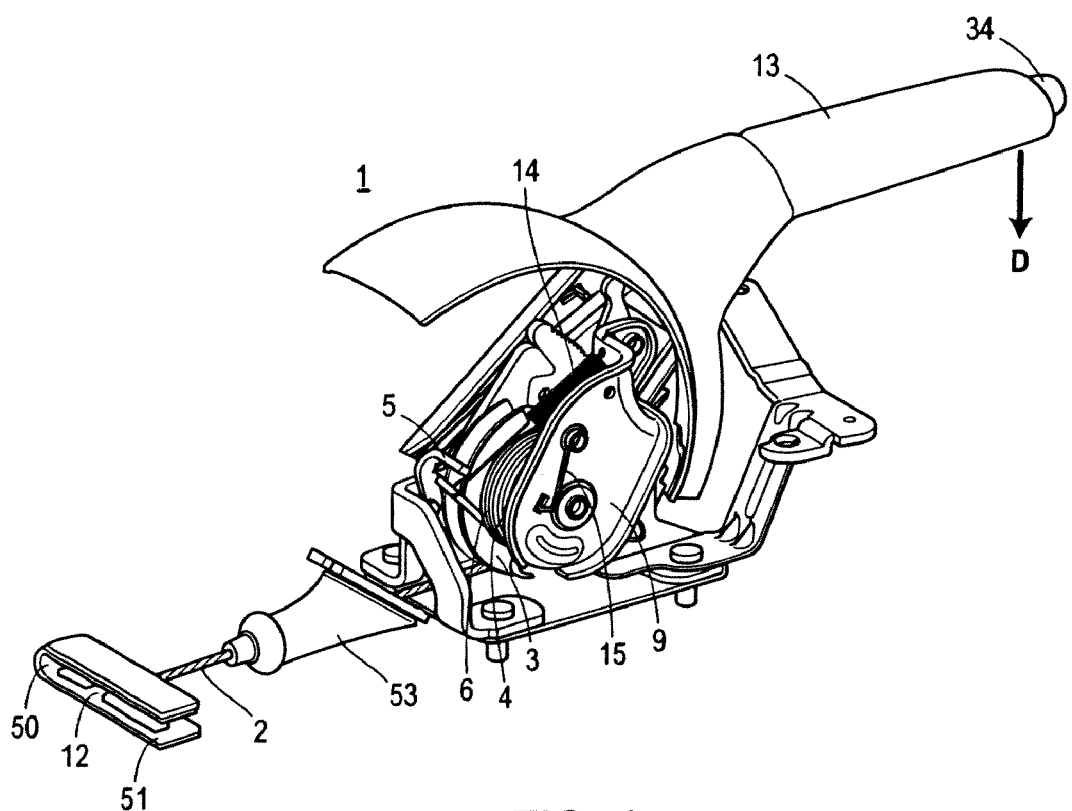
FIG. 1 shows a perspective illustration of the device.

FIG. 1 shows a device which can be used in a handbrake of a motor vehicle.

Figure 2:
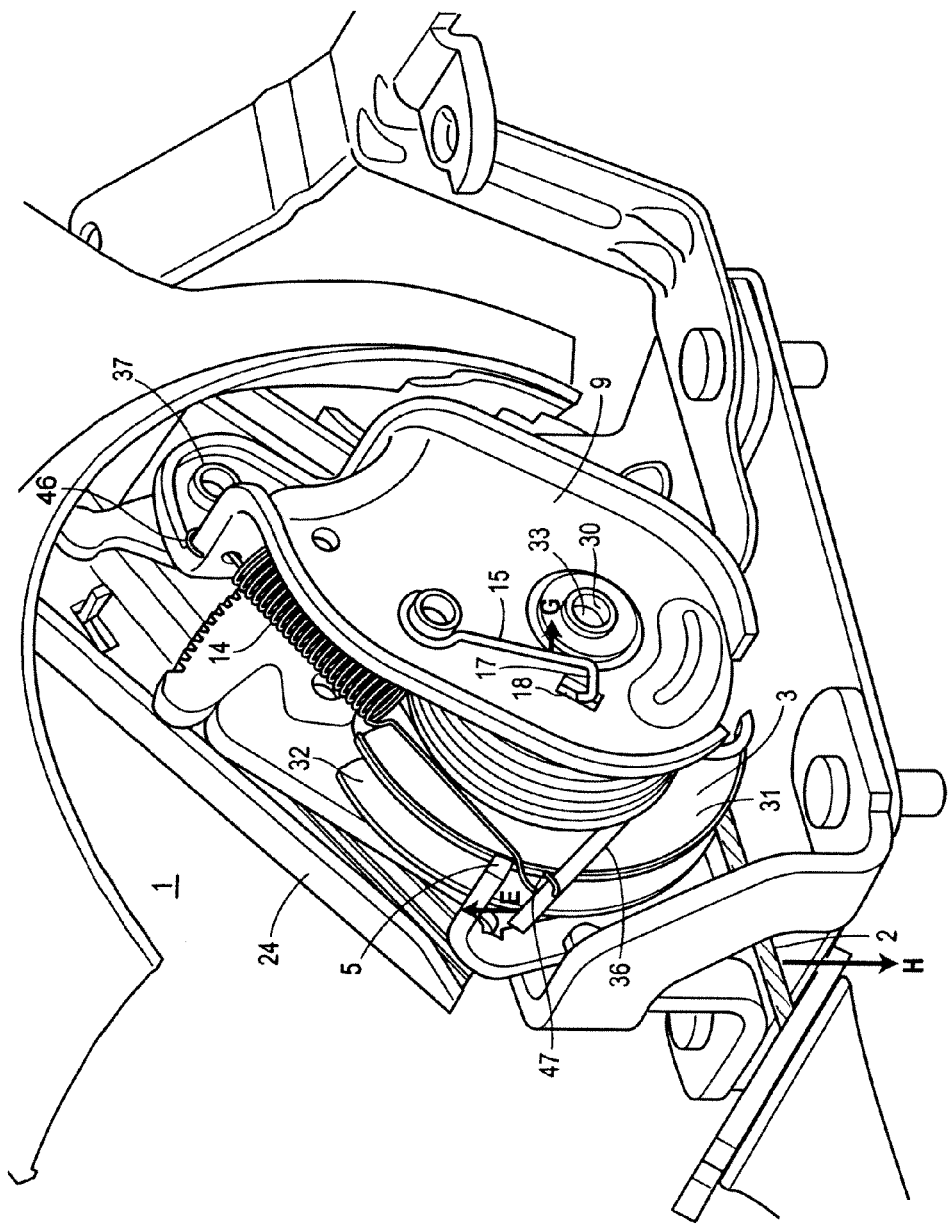
FIG. 2 shows an enlarged detail of the illustration according to FIG. 1.
Figure 3:
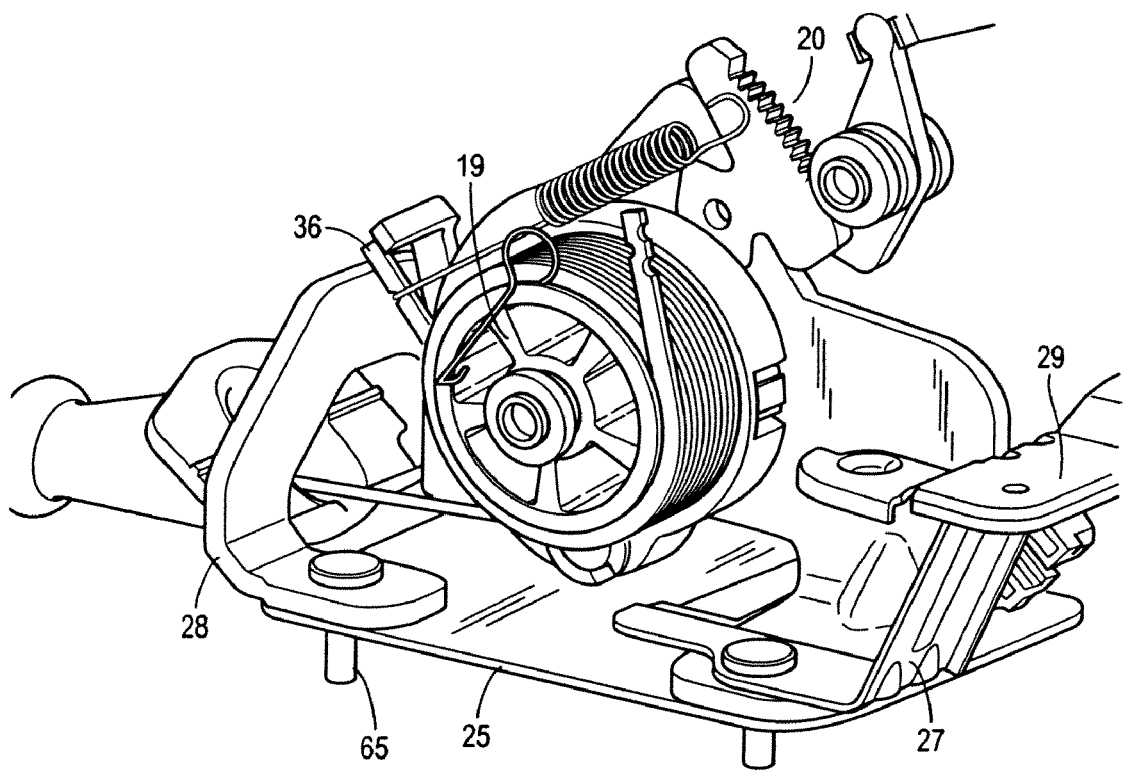
FIG. 3 shows a perspective illustration from a different viewing angle, a carrying part not being illustrated.
Figure 4:
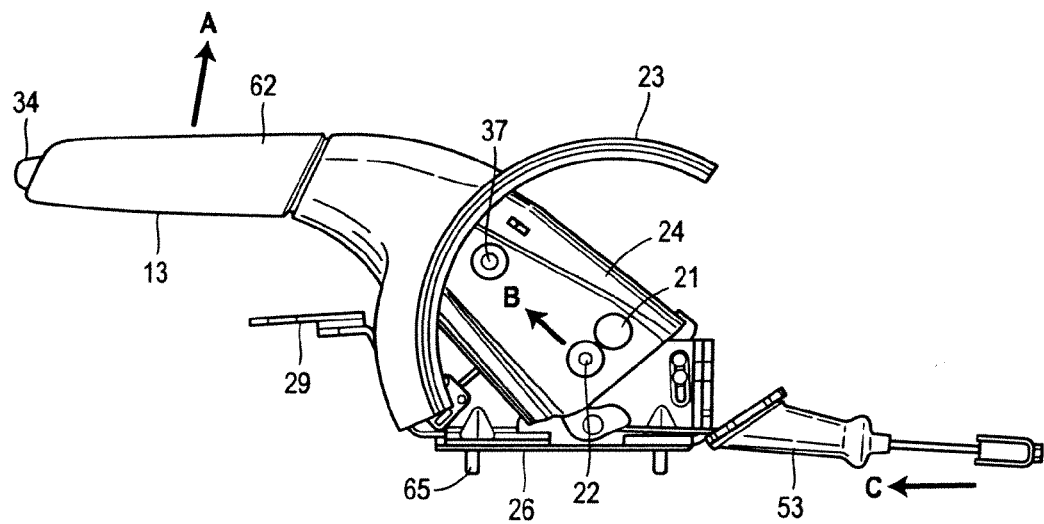
FIG. 4 shows a side view of the device.

For actuation, there is a manual actuation lever 13 which is provided at the front with an unlocking knob 34 making it possible to release the handbrake. So that the handbrake locks in the braking position, locking means 20 are present, as shown in FIG. 3. As shown in FIG. 4, the manual actuation lever 13 consists of a grip 62 which is made of insulating material and which adjoins a protecting shield 23. Arranged in the grip 62 is a metal part 24 which projects beyond the protecting shield 23. At the end located opposite the grip 62 is arranged a first bearing point 21, on which the manual actuation lever is mounted rotatably. A few centimeters away from this, a second bearing point 22 is arranged below this first bearing point 21 and is provided for mounting a tension element 3 which can be seen clearly in FIGS. 1 to 3. The second bearing point 22 is arranged somewhat nearer the grip 62 than the first bearing point 21. When the grip 62 is moved in the direction of the arrow A, therefore, as illustrated in FIG. 4, the second bearing point moves in the direction of the arrow B. Arranged fixedly on the tension element 3 is an elastic pull element 2 which, when the grip 62 is pulled in the direction of the arrow A, is moved in the direction of the arrow C, thus actuates the handbraking effect. Carrying parts 27 and 28 are connected fixedly to connection elements 65 on the baseplate 25, as shown in FIG. 3. A connecting bracket 29 for fastening the device 1 to the chassis is arranged on the part 27. As can be seen in FIG. 2, the tension element 3 is mounted at a third bearing point 30 arranged on a carrying part 9. The carrying part 9 is connected fixedly to the metal part 24 by means of a connection point 37. The second bearing point 22 is therefore arranged eccentrically to the first bearing point 21, 50 that suitable force transmission takes place when the grip 62 is pulled on the flexible pull element 2. That is to say, the second bearing point is arranged in such a way that the first centimeters of the gripping movement in the direction of the arrow A move the pull element 2 to a greater extent than the last centimeters when the grip 62 or the handbrake is locked in the braking position.

As can also be seen in FIG. 2, approximately semicircular guide webs 31 and 32 are arranged fixedly on the tension element 3 on the left and right of the pull element 2. Moreover, when the handbrake is pulled, the pull element 2 is rolled up slightly on the tension element 3, even when the tension element 3 does not rotate about its own axis of rotation 33, as will be explained below.

FIGS. 1 to 3 show the device 1 in the braking position. In this position, the tension element 3, rotatable per se, which is mounted per se at the second bearing point 22 and at the third bearing point 30, is retained by a gripping means 4 in the form of a steel spring in coil form. The steel spring is wound virtually around the tension element 3, as can be seen clearly in FIG. 3. The tension element 3 is connected virtually non-positively to the coil-like spring or the gripping means 4, unless said spring is opened, as described later. The coil-like spring is therefore connected non-positively by its own spring force to the tension element 3. Of course, in order to improve the gripping properties, intermediate elements or other means may be present between the gripping means 4 and the tension element 3. The two ends of the coil-like spring are spread out, and one end can be seen clearly in FIG. 3. The other spring end is connected fixedly to the carrying part 9. When the free spring end 36, which can be seen clearly in FIG. 2, is pressed downwards, the spring opens, because the other spring end is firmly fixed. This means that the coil-like spring or the gripping means 4 opens or the diameter of the coil-like spring becomes larger. This plays a particular role during in the automatic retensioning.

The retensioning of the pull element 2 takes place in the released position only. In the released position, the gripping means 4 is arranged so as to be capable of sliding over the tension element 3. Sliding takes place in that the free spring end 36 butts against a stop element 5. The butting of the free spring end 36 against the stop element 5 is achieved by the manual actuation lever 13 being actuated from the braking position into the released position, that is to say in the direction of the arrow D in FIG. 1. In the released position, the pull element 2 is relatively relaxed. During the lever movement in the direction of the arrow D, that is to say downwards, the free spring end 36 moves in the direction of the arrow E, that is to say upwards, until it butts onto the stop element 5, with the result that the operation of opening the gripping means 4 is initiated.

Figure 7:
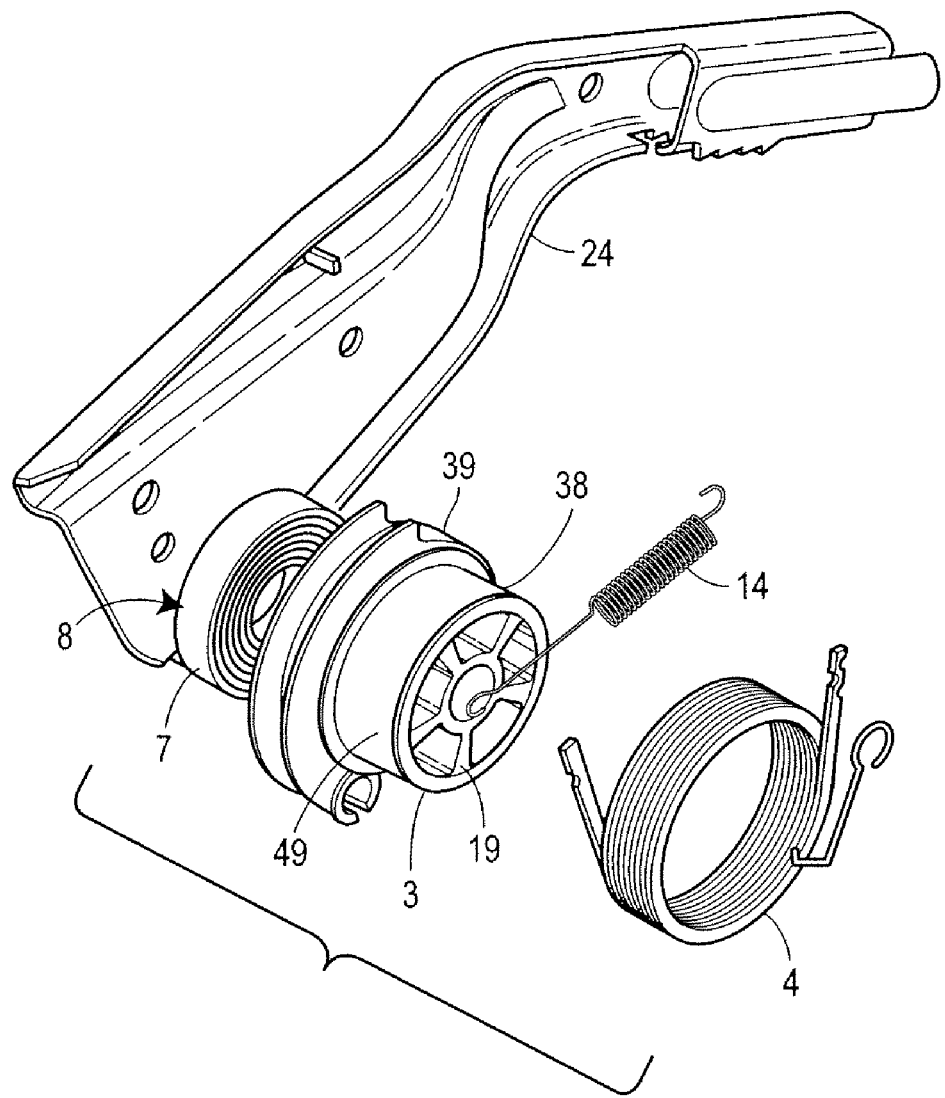
FIG. 7 shows a perspective illustration of various parts of the device which are pulled apart from one another.
Figure 8:
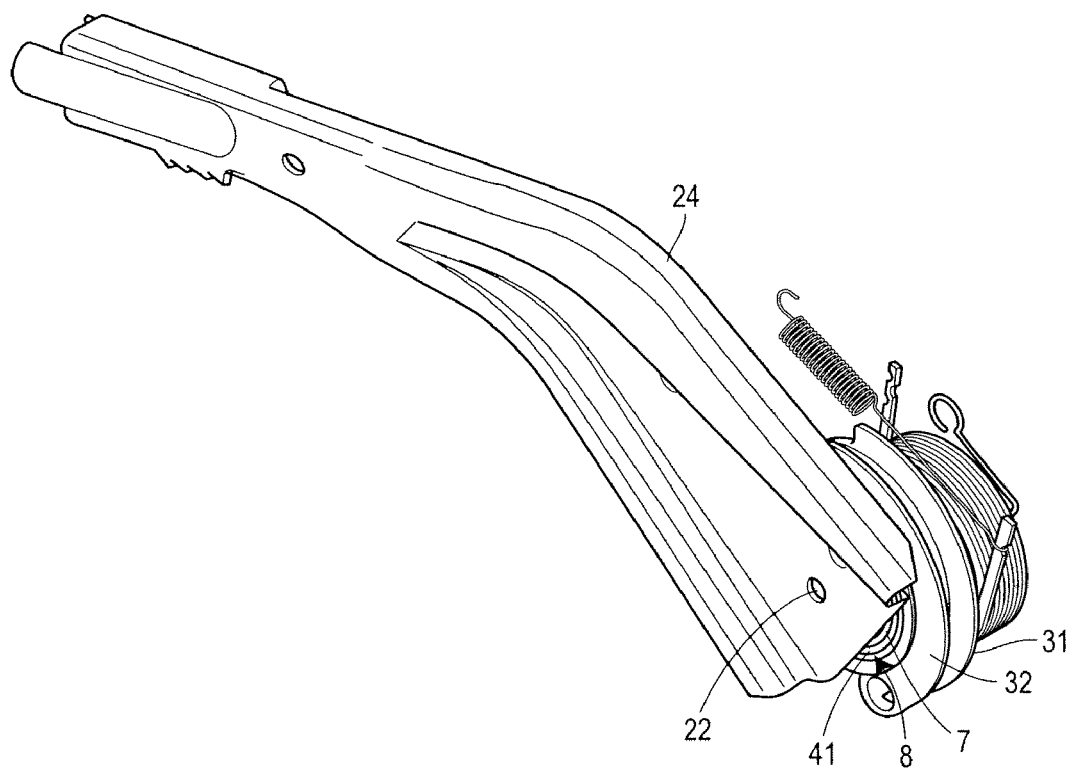
FIG. 8 shows a perspective illustration according to FIG. 7, but with mounted parts and from a different viewing angle.
Figure 9:
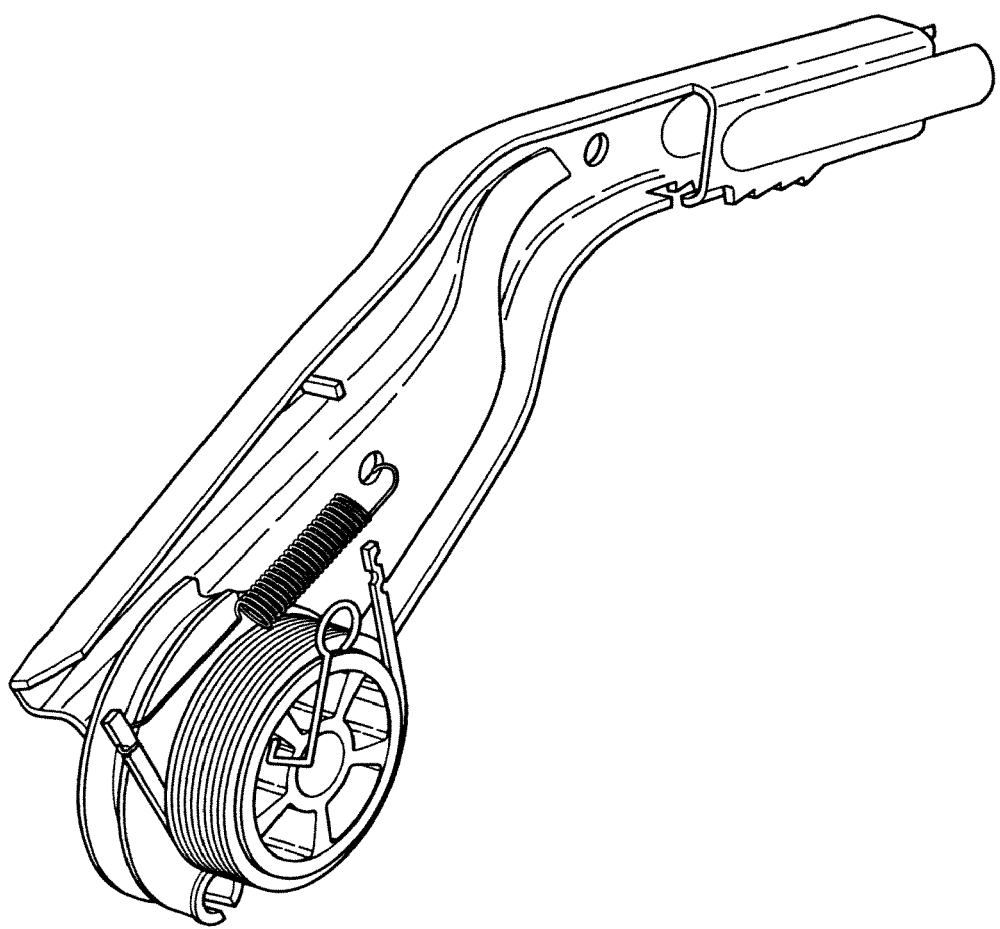
FIG. 9 shows an illustration according to FIG. 8, but from a different viewing angle.
Figure 10:
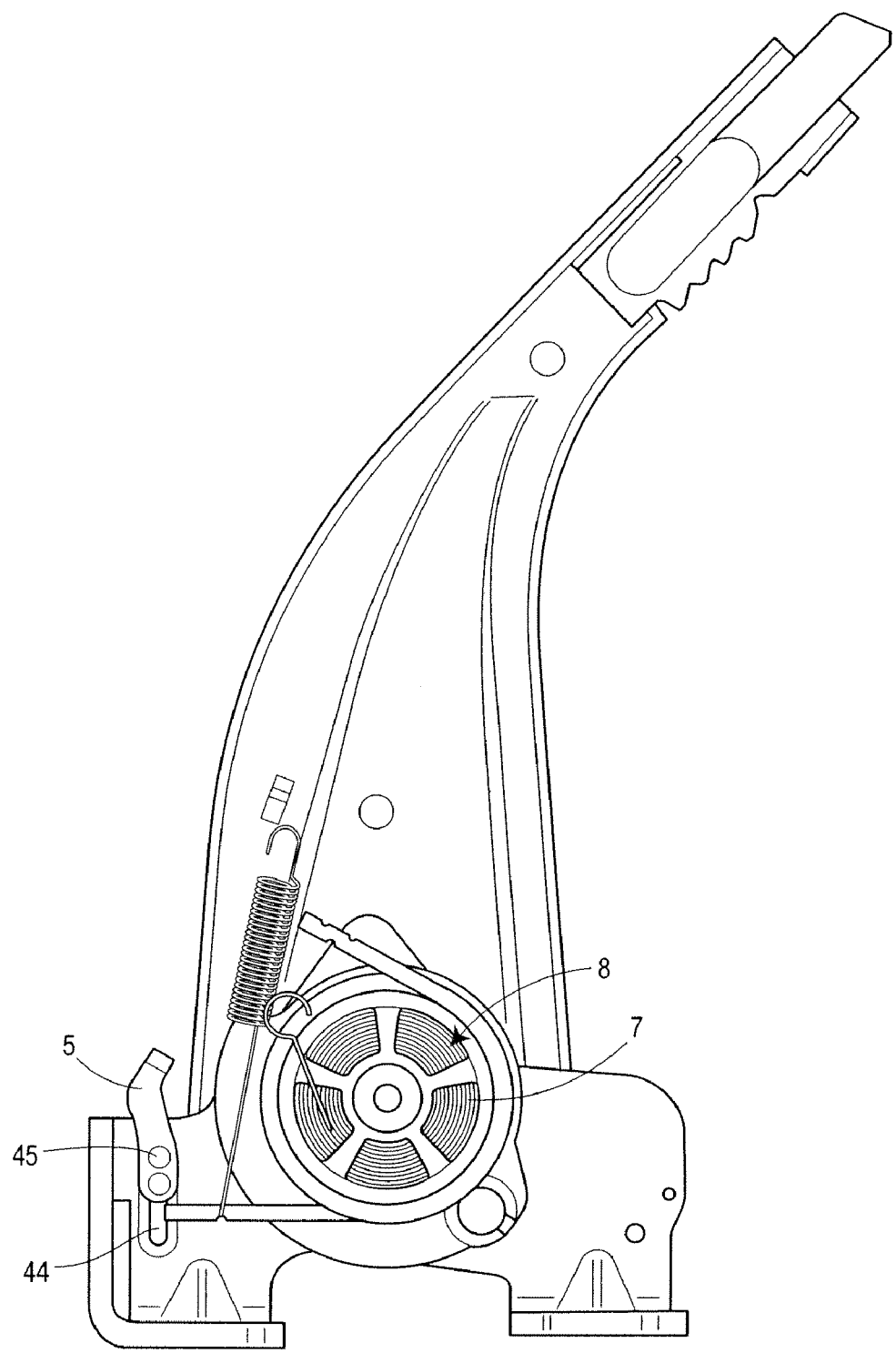
FIG. 10 shows a side view of the partially mounted device.

So that, when the tension element 3 becomes rotatable because it is no longer surrounded by the gripping means 4, it automatically tightens the pull element, a second spring element 7 in the form of a spiral-like helical spring, which can be seen in FIGS. 7, 8 and 10, is arranged inside the tension element 3, a retensioning device 8 including the spring element 7.

The spiral-like helical spring is fixedly connected at its one end to the carrying part 9, whilst the other end is connected to the tension element 3. The tension element 3 is, in practice, wound up before it can achieve the automatic pull-up function, as in a spring-driven toy. The device can therefore compensate considerable changes in length of the pull element without any problems. The pull element 2 is flexible in as much as it is bendable. Pull elements 2 of this type are known by the term "Bowden cable".

Since, in the released position, the gripping means 4 can be released from the tension element by the stop element 5 or the gripping means 4 is capable of sliding over the tension element 3 and the spring effect of the spiral-like spring or the second spring element 7 can be fully deployed, the pull element 2 is rolled up, according to its change in length due to the aging phenomenon, by means of the tension element 3.

The spring force of the second element 7 must, of course, be dimensioned in such a way that it overcomes the frictional force between the gripping means 4 and the tension element 3. Of course, the spring force of the second spring element 7 should not be so high that it achieves a braking action at the vehicle brakes. The second spring element is intended to bring about only the automatic retensioning of the pull element 2.

FIGS. 4 and 8 show the second bearing point 22, at which the tension element 3 is rotatable when it is released by the gripping means 4.

As shown in FIG. 7, the tension element 3 has a rim-like first portion 38 with a surface 49 resembling an outer cylindrical surface. The tension element 3 has, in addition to the first portion 38, a second portion 39 which has a somewhat larger diameter and is provided for guiding the pull element 2, whilst the first portion 38 is provided for receiving the gripping means 4. The guide webs 31 and 32, which are identified in FIG. 8, are arranged on the second portion 39. Inside the second portion 39 there is a hollow chamber 41, in which the second spring element 7 is embedded. In the first portion 38 are arranged five ribs which are directed radially outwards and between which there are in each case free spaces.

Figure 5:
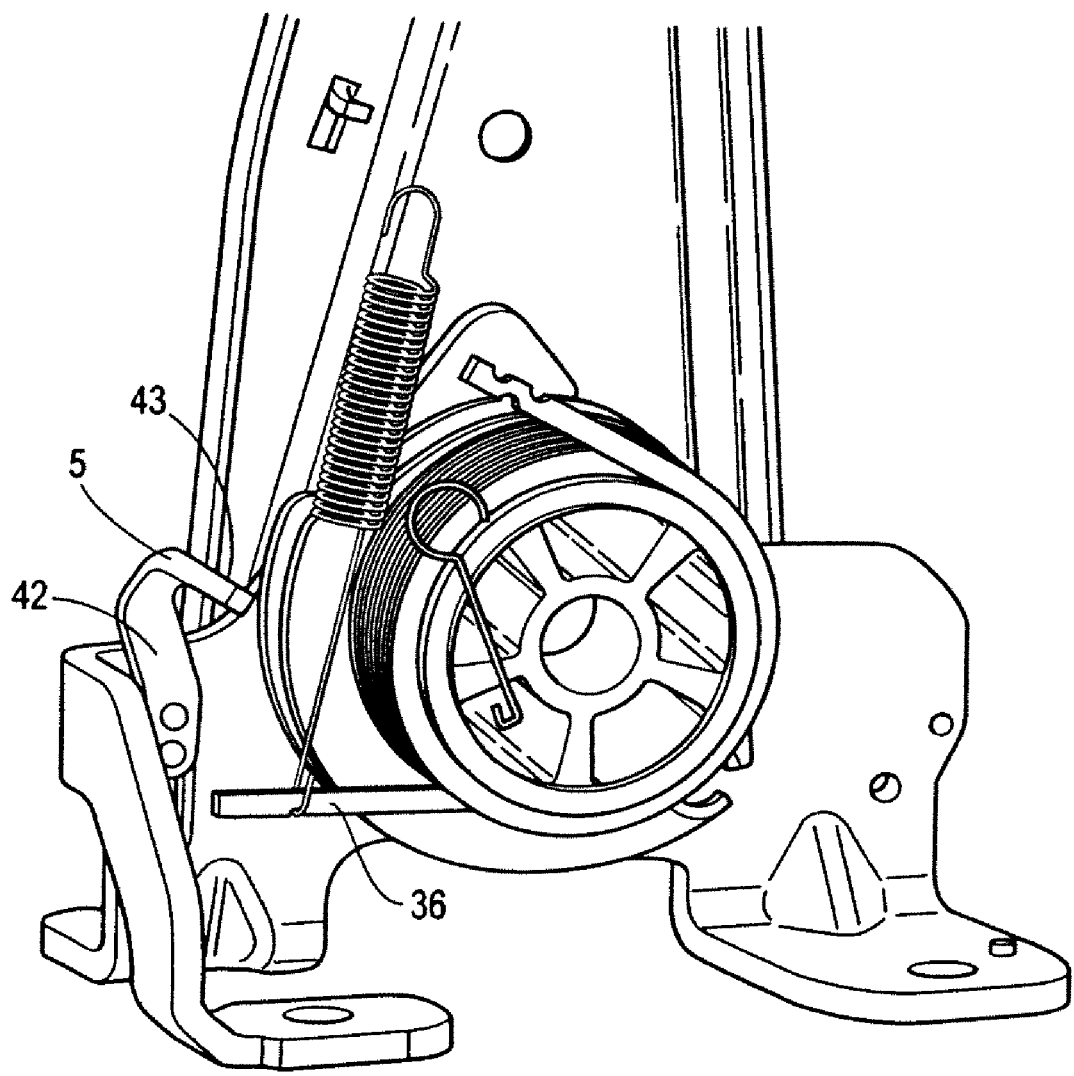
FIG. 5 shows a perspective illustration of the device which is only partially mounted.

The stop element 5, which is shown by way of example in FIG. 5, has a vertical portion 42 which adjoins a horizontal portion 43 running parallel to the axis of rotation of the tension element 3, the spring end 36, which runs tangentially to the surface of the tension element 3 resembling an outer cylindrical surface, being arranged in the region of the horizontal portion 43. Consequently, when the manual actuation lever 13 is lowered, the free spring end 36 butts onto the horizontal portion 43 of the stop element 5. The result of this is that the gripping means 4 or the coil-like helical spring is spread open in such a way that the latter can rotate or can slide with respect to the tension element 3. By the free spring end 36 being spread open, the diameter of the coil-like spring is increased slightly. Since a helical spring in spiral form, which constitutes a second spring element 7, is arranged between the metal part 24 and the tension element 3, the tension element 3 rotates counterclockwise (looking at FIG. 2) as a result of the spring force of the second spring element, so that the classic pull element 2 is automatically rolled up. It should be noted that only that piece of the flexible pull element 2 which has occurred due to wear phenomena or overstresses is rolled up.

Figure 6:
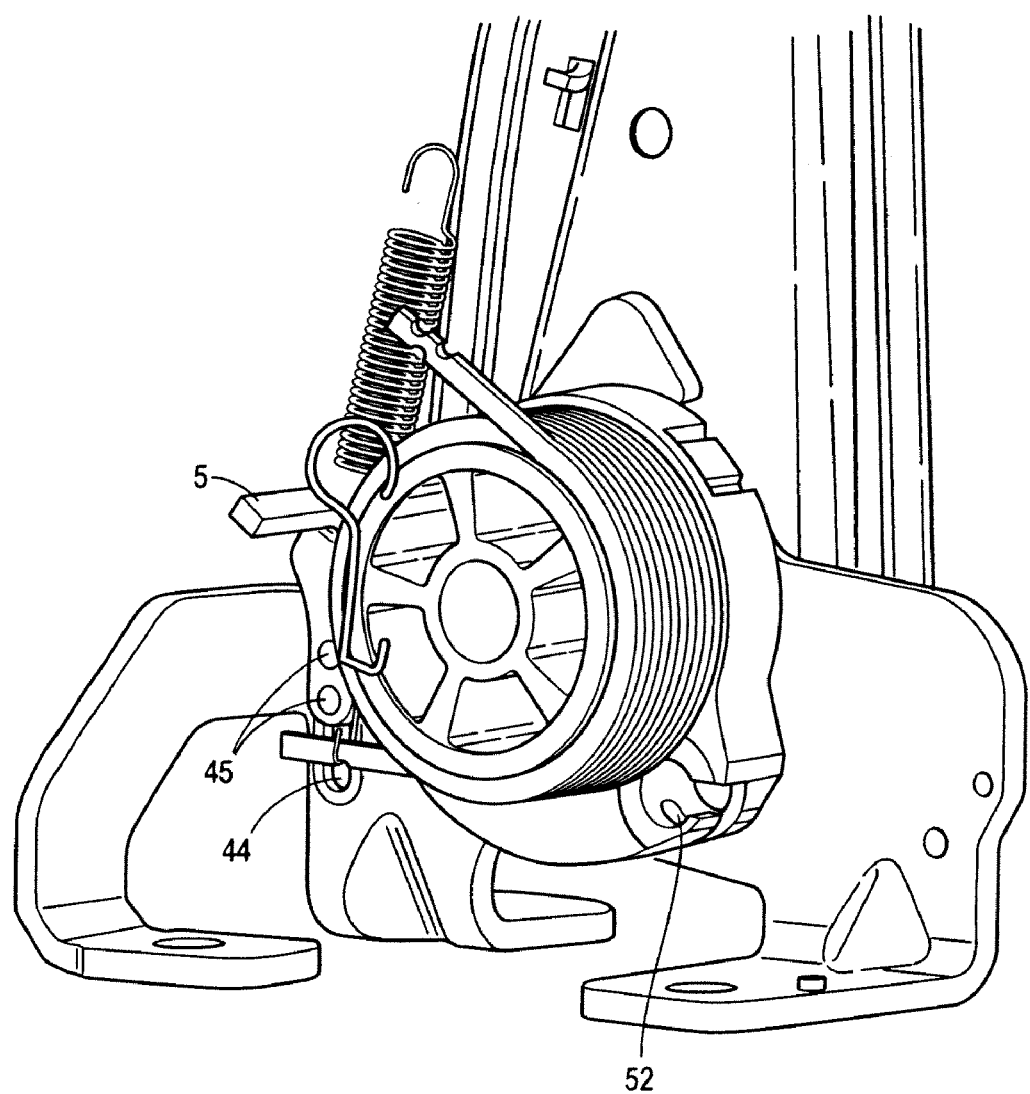
FIG. 6 shows a corresponding view of FIG. 5, but from a different viewing angle.

In order to compensate manufacturing tolerances of the coil-like spring, the stop element 5 is correspondingly adjustable. For this purpose, there is on the carrying part 28 a elongated hole 44, to which the stop element 5 can be fastened by means of a rivet connection 45. The stop element 5 is thus arranged so as to be vertically adjustable. This adjustment takes place only during initial mounting, wherein the stop element 5 is being connected fixedly to the carrying part 28. FIG. 6 shown the elongated hole 44 and the corresponding rivet connection 45.

As shown in FIG. 2, the device 1 has a third spring element 14 which is arranged between the carrier part 9 of the device 1 and the first spring element 6 in such a way that, in the braking position, the third spring element has a force-intensifying effect in order to increase the non-positive connection of the gripping means 4 to the tension element 3, whilst, in the released position, the stop element 5 counteracts the force effect of the third spring element, with the result that, in the released position, the gripping means 4 continues to be capable of sliding with respect to the tension element 3. For this purpose, as shown in FIG. 2, one spring end of the third spring element 14 is connected to the carrier part 9, this spring end having the reference number 46, whilst the other spring end 47 is connected to the free spring end 36 of the coil-like spring or to the gripping means 4. By virtue of this arrangement, the coil-like helical spring or the gripping means 4 is additionally pressed firmly on the tension element 3, thus ensuring that, when the device 1 is in the braking position, the gripping means 4 does not in any case slide with respect to the tension element 3, so that the corresponding standard regulations can be met. When the manual actuation lever 13 is moved into the released position, the free spring end 36 butts onto the stop element 5, of course, with the result that the third spring element 14 loses its effect. That is to say, the stop element 5 counteracts the force of the third spring element.

As shown in FIG. 1, a compensating element 12 is arranged on the flexible pull element 2 between the actual vehicle brakes. The compensating element 12 is arranged, approximately T-shaped, on the pull element 2, the flexible pull element 2 being arranged in the middle and further flexible pull elements, not illustrated, which are connected to the vehicle brakes, being arranged at the ends on the opposite side. An appropriate angular position of the pull element 2 together with the compensating element 12 ensures that the two vehicle brakes are actuated equally well. This arrangement corresponds to the arrangement similar to a balance. The compensating element 12 is designed as a U profile, the points at which the actual pull elements of the vehicle brake are arranged being given the reference numbers 50 and 51.

As shown in FIG. 2, the device 1 is provided with a mounting securing element 15 which is designed as a resilient wire-like securing element, the mounting securing element 15 being fixedly connected at one end to the carrier part 9, and there being arranged at the other end a hook-like projection 17 which is capable of penetrating with its projection, counter to its spring force, into a window-like orifice 18 arranged on the carrier part 9. Behind the orifice 18 are arranged the ribs 19 of the tension element 3 to which the mounting securing element 15 can be anchored. The ribs 19 can be seen clearly in FIGS. 5 to 7. One end of the mounting securing element 15 is screwed to the carrier part 9 and is therefore connected captively to the device 1. The mounting securing element 15 serves for holding the tension element 3 during mounting. Before the device 1 is mounted in the vehicle, the mounting securing element 15 is inserted in the orifice 18, with the result that a rib 19 butts on the hook-like projection 17, thus preventing the tension element 3 from rotating. Since the mounting securing element 15 is also retained, in practice, by the rib 19, it cannot emerge from the orifice 18, even though its spring force points in the direction of the arrow G. When the mounting of the device 1 in the vehicle is finished, the mounting securing element 15 automatically jumps out of the window-like orifice 18 when the pull element 2 is pulled in the direction of the arrow H, with the result that the securing is automatically released. This was achieved by the projection 17 losing its hold on the rib 19.

Furthermore, FIG. 6 shows a fastening point 52 for the pull element 2, the fastening point 52 being arranged on the second portion 39 in the tension element 3. Moreover, FIGS. 1 and 2 show an elastic sealing element 53 which can be arranged at an appropriate orifice in the vehicle frame.

In this exemplary embodiment, the tension element 3, which is provided with the gripping means 4 acting non-positively on the tension element 3 under the spring effect of the first spring element 6, has an essentially rotationally symmetrical design, and the gripping means 4 is designed in the form of a coil-like helical spring. Other arrangements, for example a linear arrangement, may be envisaged, however, in which a different gripping element 4 non-positively clamps the tension element 3, which may have a completely different geometric shape. It is important that, in the released position, the gripping means 4 be capable of being released from the tension element by the stop element 5 arranged on the device 1 in such a way that the gripping means 4 is capable of sliding, or of any other movement over the tension element 3. The stop element 5 does not need to be produced as a loose part, but may, for example, also be a punched-out nose or the like. Automatic retensioning takes place essentially in that, that in the released position, the tension element 3 is arranged so as to be movable under the effect of the second spring element 7 in such a way and the spring force of the second spring element 7 is dimensioned in such a way that the tension element 3 automatically pulls on the pull element 2. In order to hold the functioning of the handbrake, it is, of course, necessary, in the braking position, for the gripping element 4 to be connected non-positively to the tension element 3.

The invention is not only restricted to this exemplary embodiment, but also comprises other solutions, in which any gripping means, irrespective of its geometric shape, acts non-positively on any desired tension element.

The invention claimed is:

1. A device for the actuation of at least one vehicle brake, with a pull element which can be brought into a braking position of said vehicle brake, the pull element being capable of being tensioned by a tension element in the braking position, and which can be brought into a released position, in which the pull element is relaxed to an extent such that the vehicle brake is released, the device being provided with a retensioning device which, in the released position, automatically retensions the pull element, wherein:

the tension element is provided with at least one gripping means in the form of a first coil spring which is under a spring effect due to its own spring force and which in the braking position, acts non-positively on the tension element under the spring effect;

in the released position, the gripping means is released from the tension element in such a way that the gripping means slides over the tension element;

in the released position, the tension element is arranged so as to be movable under the effect of the retensioning device including a second spring element, the spring force of the second spring element being dimensioned so that the pull element is automatically retensioned; and a third spring element is arranged between a carrier part and the gripping means in such a way that, in the braking position, the third spring element has a force-intensifying effect in order to increase the non-positive connection of the gripping means to the tension element, the third spring element being connected at a first end to the carrier part and at a second end to the gripping means.

2. The device according to claim 1, wherein the tension element is arranged so as to be rotatable under the effect of the second spring element, and, in the released position, the release of the gripping means is brought about by means of a stop element.

3. The device according to claim 2, wherein an axis of rotation of the tension element is arranged eccentrically to a center of rotation of a manual actuation lever.

4. The device according to claim 3, wherein the tension element has a cylindrical portion, around which the coil spring is fixedly arranged, and wherein a first end of the coil spring is fixedly connected to a carrying part while a second end of the coil spring forms an actuating portion arranged tangentially to an outer cylindrical surface of the cylindrical portion, the second end of the coil spring adapted for actuation by the stop element such that the diameter of the coil spring is increased sufficiently such that the cylindrical portion is released by the coil spring.

5. The device according to claim 2, wherein the stop element is adjustably positioned.

6. The device according to claim 1, further comprising a compensating element arranged on the pull element.

7. The device according to claim 2, wherein the stop element in the released position counteracts the force effect of the third spring element so that, in the released position, the gripping means continues to be capable of sliding with respect to the tension element.

8. The device according to claim 1, wherein the second spring element comprises a helical spring in worm form.

9. The device according to claim 1, further comprising a mounting securing element having a mounting position in which the mounting securing element retains the tension element.

10. The device according to claim 9, wherein the mounting securing element is captively connected to the carrier part.

11. The device according to claim 10, wherein the mounting securing element has a first end fixedly connected to the carrier part and a second end having a hook capable of penetrating into an orifice counter to the spring force, wherein a rib of the tension element is positioned behind the orifice, and wherein the mounting securing element is adapted for anchoring to the rib.

12. The device according to claim 2, wherein the gripping means has a free end that abuts the stop element to release the gripping means, and the third spring element is connected at a first end to the carrier part and at a second end to the free end of the gripping means.

* * * * *